US009071840B2

United States Patent
Yin et al.

(10) Patent No.: US 9,071,840 B2
(45) Date of Patent: Jun. 30, 2015

(54) ENCODER WITH ADAPTIVE RATE CONTROL FOR H.264

(75) Inventors: Peng Yin, West Windsor, NJ (US); Jill MacDonald Boyce, Manalapan, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1611 days.

(21) Appl. No.: 10/586,123

(22) PCT Filed: Jan. 11, 2005

(86) PCT No.: PCT/US2005/000755
§ 371 (c)(1),
(2), (4) Date: Jul. 14, 2006

(87) PCT Pub. No.: WO2005/076632
PCT Pub. Date: Aug. 18, 2005

(65) Prior Publication Data
US 2007/0153892 A1    Jul. 5, 2007

Related U.S. Application Data

(60) Provisional application No. 60/540,634, filed on Jan. 30, 2004.

(51) Int. Cl.
*H04N 7/12* (2006.01)
*H04N 11/02* (2006.01)
(Continued)

(52) U.S. Cl.
CPC ............. *H04N 19/19* (2014.11); *H04N 19/176* (2014.11); *H04N 19/147* (2014.11);
(Continued)

(58) Field of Classification Search
CPC .. H04N 7/50; H04N 7/26244; H04N 7/26085
USPC ........................................ 375/240.03, 240.24
See application file for complete search history.

(56) References Cited

U.S. PATENT DOCUMENTS 6,141,446 A * 10/2000 Boliek et al. .................. 382/233
6,205,174 B1 * 3/2001 Fert et al. ................. 375/240.03
(Continued)

FOREIGN PATENT DOCUMENTS

| CN | 1434638 A | 8/2003 |
|---|---|---|
| CN | 1471319 A | 1/2004 |

(Continued)

OTHER PUBLICATIONS

Search Report dated Jul. 6, 2005.
(Continued)

*Primary Examiner* — Chikaodili E Anyikire
(74) *Attorney, Agent, or Firm* — Robert D. Shedd; Iuliana Tanase

(57) ABSTRACT

A video encoder is disclosed, the encoder for encoding image frames that are divisible into macroblocks. The video encoder includes means for generating a QP estimate for the macroblocks of an image frame. The video encoder further includes means for selection of a frame level quantization parameter (QP) for the image frame, using one of mean, median, and mode of QP estimates for the macroblocks. A method for encoding video is disclosed for encoding image frames that are divisible into macroblocks. The method generates a quantization parameter (QP) estimate for the macroblocks of an image frame and selects a frame level QP for the image frame, using one of mean, median, and mode of QP estimates for the macroblocks.

41 Claims, 2 Drawing Sheets

(51) Int. Cl.
  H04N 11/04      (2006.01)
  H04N 19/19      (2014.01)
  H04N 19/176     (2014.01)
  H04N 19/147     (2014.01)
  H04N 19/172     (2014.01)
  H04N 19/15      (2014.01)
  H04N 19/61      (2014.01)
  H04N 19/124     (2014.01)
  H04N 19/132     (2014.01)
  H04N 19/152     (2014.01)

(52) U.S. Cl.
  CPC ............ *H04N 19/172* (2014.11); *H04N 19/15* (2014.11); *H04N 19/61* (2014.11); *H04N 19/124* (2014.11); *H04N 19/132* (2014.11); *H04N 19/152* (2014.11)

(56) References Cited

U.S. PATENT DOCUMENTS

| | | | |
|---|---|---|---|
| 6,385,241 B1* | 5/2002 | Saw | 375/240.03 |
| 6,668,088 B1* | 12/2003 | Werner et al. | 382/239 |
| 6,763,068 B2* | 7/2004 | Oktem | 375/240.03 |
| 7,280,700 B2 | 10/2007 | Tourapis et al. | |
| 7,916,783 B2 | 3/2011 | Gao et al. | |
| 2002/0021754 A1 | 2/2002 | Pian et al. | |
| 2002/0136297 A1* | 9/2002 | Shimada et al. | 375/240.04 |
| 2003/0031128 A1* | 2/2003 | Kim et al. | 370/229 |
| 2003/0031251 A1* | 2/2003 | Koto | 375/240.03 |
| 2003/0072364 A1* | 4/2003 | Kim et al. | 375/240.03 |
| 2003/0108102 A1* | 6/2003 | Demos | 375/240.07 |
| 2003/0123539 A1* | 7/2003 | Kim et al. | 375/240.03 |
| 2003/0128756 A1* | 7/2003 | Oktem | 375/240.03 |
| 2003/0174775 A1* | 9/2003 | Nagaya et al. | 375/240.12 |
| 2004/0179596 A1* | 9/2004 | Song et al. | 375/240.03 |
| 2006/0171454 A1* | 8/2006 | Jung | 375/240.03 |

FOREIGN PATENT DOCUMENTS

| | | |
|---|---|---|
| JP | 9331531 | 12/1997 |
| JP | 2000-287210 | 10/2000 |
| JP | 2000287212 | 10/2000 |
| JP | 2001-28753 | 1/2001 |
| JP | 2002-058038 | 2/2002 |
| JP | 20039156 | 1/2003 |
| JP | 200392759 | 3/2003 |
| KR | 10-2004-0004178 | 1/2004 |

OTHER PUBLICATIONS

Zhengguo Li, Wen Geo, Feg. Pan, Siwei MA, Keng Pang Lim, Genan Feng, Xiao Lin, Susanto Rahardja, Hanquin Li. Yan Lu: "Adaptive Control With HRD Consideration" ISO/IEC JTC1/SC29/WG11 & ITU-T SG16 Q.6-JVT-H014, May 26, 2003, pp. 1-18 XP002328786.

Yin et al., "A New Rate Control Scheme for H 264 Video Coding," 2004 International Conference on Image Processing (ICIP'2004), vol. 1, 5 pages.

He et al., "Linear Rate Control for JVT Video Coding," ITRE 2003, IEEE 203, pp. 65-68.

Wiegand et al., "Overview of the H.264/AVC Video Coding Standard," IEEE Transaction on Circuits and Systems for Video Technology, vol. 13, No. 7, Jul. 2003, pp. 560-576.

Ribas-Corbera et al., "Rate Control in DCT Video Coding for Low-Delay Communications," IEEE Transactions on Circuits and Systems for Video Technology, vol. 9, No. 1, Feb. 1999, pp. 172-185.

Yin et al., "Fast Mode Decision and Motion Estimation for JVT/H. 264," 2003 IEEE Proceedings of the International Conference on Image Processing (ICIP'2003), Sep. 14-17, 2003, pp. III 853-856.

* cited by examiner

ENCODER WITH ADAPTIVE RATE CONTROL FOR H.264

CROSS-REFERENCE TO RELATED APPLICATIONS

This application claims the benefit, under 35 U.S.C. §365 of International Application PCT/US2005/000755, filed Jan. 11, 2005, which was published in accordance with PCT Article 21(2) on Aug. 18, 2005, in English and which claims the benefit of U.S. provisional patent application No. 60/540,634 filed Jan. 30, 2004.

FIELD OF THE INVENTION

The present invention relates generally video encoders and, more particularly, to an video encoder with adaptive rate control.

BACKGROUND OF THE INVENTION

Rate control is necessary in a Joint Video Team (JVT) video encoder to achieve particular constant bitrates, when needed for fixed channel bandwidth applications with limited buffer sizes. Avoiding buffer overflow and underflow is more challenging on video content that includes sections with different complexity characteristics, for example, sections with scene changes and dissolves.

Rate control has been studied for previous video compression standards. TMN8 was proposed for H.263+. The TMN8 rate control uses a frame-layer rate control to select the target number of bits for the current frame and a macroblock-layer rate control to select the value of the quantization parameter (QP) for the macroblocks.

In the frame-layer rate control, the target number of bits for the current frame is determined by $$B = R/F - \Delta, \quad (1)$$

$$\Delta = \begin{cases} W/F, & W > Z \cdot M \\ W - Z \cdot M, & \text{otherwise} \end{cases} \quad (2)$$

$$W = \max(W_{prev} + B' - R/F, 0) \quad (3)$$

where B is the target number of bits for a frame, R is the channel rate in bits per second, F is the frame rate in frames per second, W is the number of bits in the encoder buffer, M is the maximum buffer size, $W_{prev}$ is the previous number of bits in the buffer, B' is the actual number of bits used for encoding the previous frame, and Z=0.1 is set by default to achieve the low delay.

The macroblock-layer rate control selects the value of the quantization step size for all the macroblocks in a frame, so that the sum of the macroblock bits is close to the frame target number of bits B. The optimal quantization step size $Q_i^*$ for macroblock i in a frame can be determined by $$Q_i^* = \sqrt{\frac{AK}{\beta_i - AN_iC} \frac{\sigma_i}{\alpha_i} \sum_{k=1}^{N} \alpha_k \sigma_k}, \quad (4)$$

where K is the model parameter, A is the number of pixels in a macroblock, $N_i$ is the number of macroblocks that remain to be encoded in the frame, $\sigma_i$ is the standard deviation of the residue in the ith macroblock, $\alpha_i$ is the distortion weight of the ith macroblock, C is the overhead rate, and $\beta_i$ is the number of bits left for encoding the frame by setting $\beta_1$=B at the initialization stage.

The TMN8 scheme is simple and is known to be able to achieve both high quality and an accurate bit rate, but is not well suited to H.264. Rate-distortion optimization (RDO) (e.g., rate-constrained motion estimation and mode decision) is a widely accepted approach in H.264 for mode decision and motion estimation, where the quantization parameter (QP) (used to decide λ in the Lagrangian optimization) needs to be decided before RDO is performed. But the TMN8 model requires the statistics of the prediction error signal (residue) to estimate the QP, which means that motion estimation and mode decision needs to be performed before the QP is determined, thus resulting in a dilemma of which dependent parameter must be calculated first, each value requiring knowledge about the other uncalculated value on which to base the determination.

To overcome the dilemma mentioned above, a method (hereinafter the "first conventional method") proposed for H.264 rate control and incorporated into the JVT JM reference software release JM7.4 uses the residue of the collocated macroblock in the most recently coded picture with the same type to predict that of the current macroblock. Moreover, to also overcome the dilemma, another method (hereinafter the "second conventional method") proposed for H.264 rate control employs a two-step encoding, where the QP of the previous picture ($QP_{prev}$) is first used to generate the residue, and then the QP of the current macroblock is estimated based on the residue. The former approach (i.e., the first conventional method) is simple, but it lacks precision. The latter approach (i.e., the second conventional method) is more accurate, but it requires multiple encoding, thus adding much complexity.

SUMMARY OF THE INVENTION

These and other drawbacks and disadvantages of the prior art are addressed by the present invention, which is directed to an encoder with adaptive rate control.

According to an aspect of the present invention, there is provided a video encoder for encoding image frames that are divisible into macroblocks. The video encoder includes means for generating a quantization parameter (QP) estimate for the macroblocks of an image frame. The video encoder further includes means for selection of a frame level QP for the image frame, using one of mean, median, and mode of QP estimates for the macroblocks.

According to another aspect of the present invention, there is provided a method for encoding image frames that are divisible into macroblocks. The method includes the step of generating a quantization parameter estimate for the macroblocks of an image frame. The method further includes the step of selecting a frame level QP for the image frame, using one of mean, median, and mode of QP estimates for the macroblocks.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION OF PREFERRED EMBODIMENTS

Figure 1:
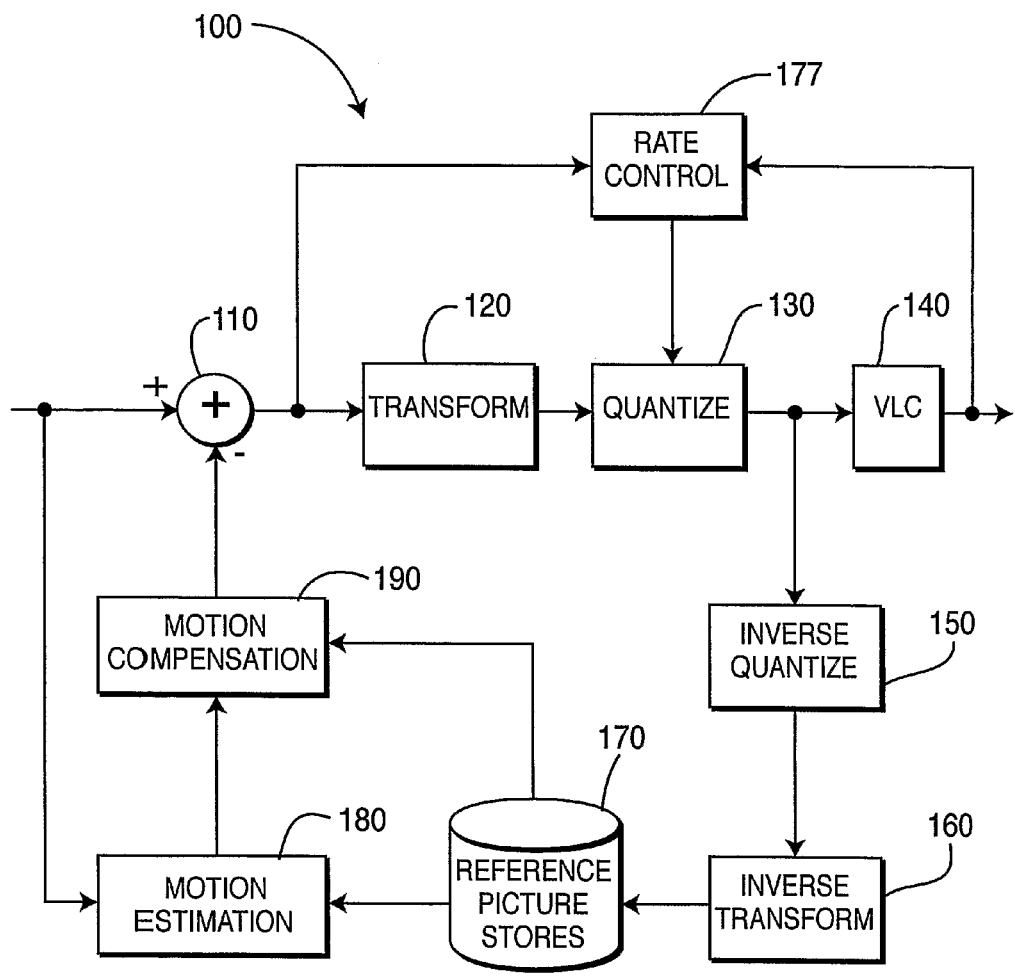
FIG. 1 shows a block diagram for a video encoder.

The present invention is directed to an encoder with adaptive rate control. Advantageously, the present invention avoids buffer overflow and underflow in a video encoder, particularly in the case of video content that includes sections with different complexity characteristics.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those-skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicants thus regard any means that can provide those functionalities as equivalent to those shown herein.

In FIG. 1, a video encoder is shown with an encoder 100 input connected in signal communication with a non-inverting input of a summing junction 110. The output of the summing junction 110 is connected in signal communication with a block transformer 120. The transformer 120 is connected in signal communication with a first input of a quantizer 130. The output of the quantizer 130 is connected in signal communication with a variable length coder ("VLC") 140, where the output of the VLC 140 is an externally available output of the encoder 100. A first input of a rate controller 177 is connected in signal communication with the output of the summing junction 110, a second input of the rate controller 177 is connected in signal communication with the output of the VLC 140, and an output of the rate controller 177 is connected in signal communication with a second input of the quantizer 130.

The output of the quantizer 130 is further connected in signal communication with an inverse quantizer 150. The inverse quantizer 150 is connected in signal communication with an inverse block transformer 160, which, in turn, is connected in signal communication with a reference picture store 170. A first output of the reference picture store 170 is connected in signal communication with a first input of a motion estimator 180. The input to the encoder 100 is further connected in signal communication with a second input of the motion estimator 180. The output of the motion estimator 180 is connected in signal communication with a first input of a motion compensator 190. A second output of the reference picture store 170 is connected in signal communication with a second input of the motion compensator 190. The output of the motion compensator 190 is connected in signal communication with an inverting input of the summing junction 110.

Figure 2:
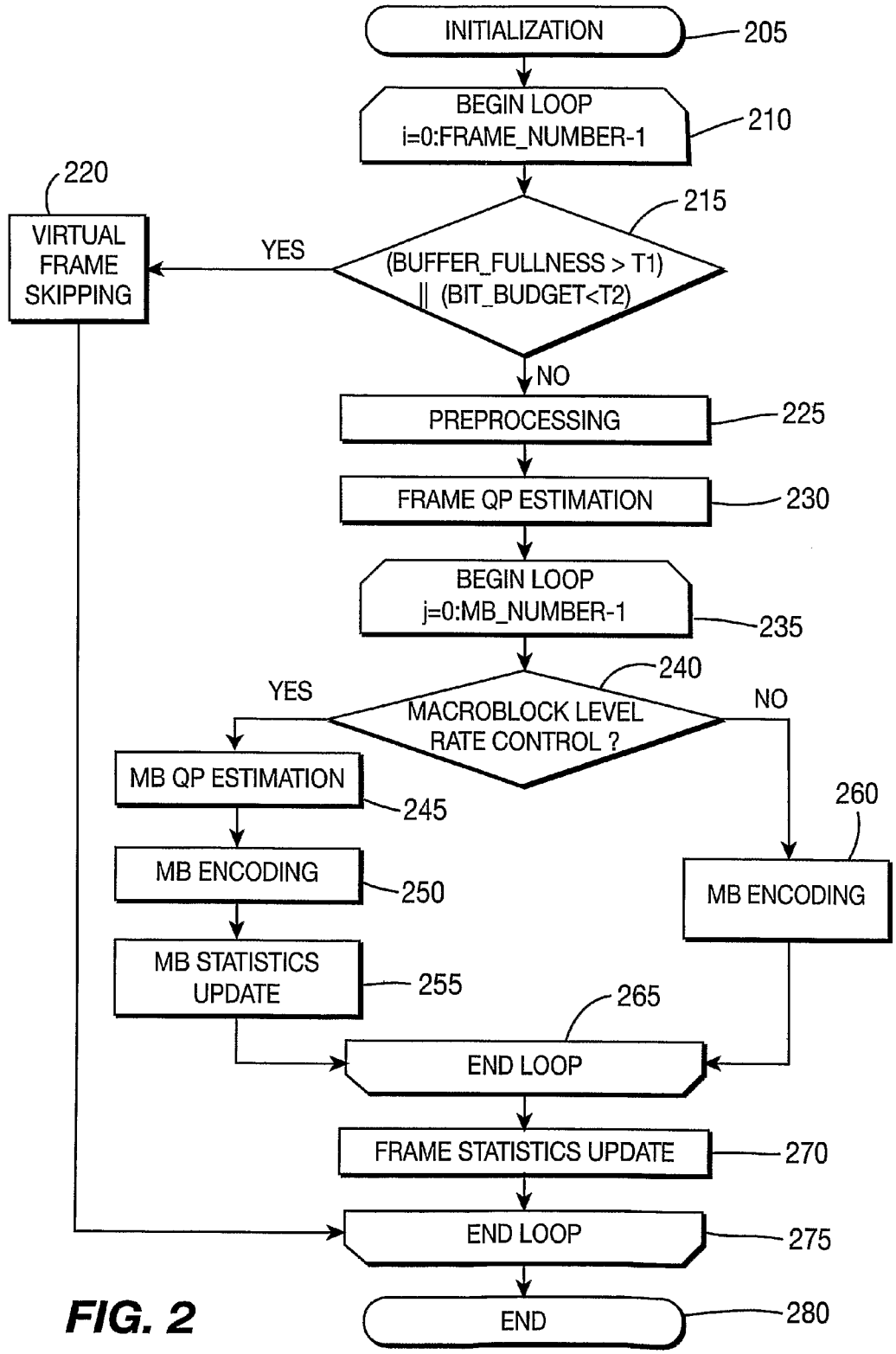
FIG. 2 shows a flowchart for an encoding process with rate control in accordance with the principles of the present invention.

Turning now to FIG. 2, an exemplary process for encoding image blocks with rate control is generally indicated by the reference numeral 200. The process includes an initialization block 205 which initializes a buffer, calculates the average target frame bits or average target Group Of Pictures (GOP) bits, sets the initial value of all the rate control related parameters, and so forth. The initialization block 205 passes control to a loop limit block 210 which begins a first loop and sets i=0 (range 0 to frame_number-1), and passes control to a decision block 215.

In decision block 215, it is determined (for the current frame) whether the buffer fullness (buffer_fullness) is greater than a first threshold T1 and whether the available bits to code the frame (bit_budget) are less than a second threshold T2.

If buffer_fullness is greater than T1 and/or bit_budget is less than T2, then control passes to function block 220, which performs virtual frame skipping, and passes control to an end loop block 275 for next frame (i<frame_number) or ends the first loop (i==frame_number). Otherwise, if buffer_fullness is less than or equal to T1 and bit_budget is greater than or equal to T2, then control passes to a function block 225.

The function block 225 performs a pre-processing of the frame depending on the picture type to obtain an estimation of the prediction residual, and passes control to a function block 230. The pre-processing performed by function block 225 for I pictures may include intra coding using a subset of allowable intra prediction modes to form predictions, and may use mean square error with respect to prediction residuals of the predictions formed using the subset to determine a best mode from among the subset of allowable intra prediction modes. The pre-processing performed by function block 225 for P pictures may include performing motion estimation with only the 16×16 block type and 1 reference picture. It is to be appreciated that as used herein, the phrase "best mode" refers to a prediction mode that results in the most accurate prediction for a given frame and/or image block.

The function block 230 performs frame quantization parameter (QP) estimation based on statistics generated by the pre-processing block 225, and passes control to a loop limit block 235. The loop limit block 235 begins a second loop, sets j=0 (range 0 to MB_number-1), and passes control to a decision block 240.

The decision block 240 determines whether macroblock-level rate control is allowed. If macroblock-level rate control is not allowed, then control is passed to a function block 260, which codes every macroblock of the frame with the frame QP, and passes control to an end loop block 265 that ends the second loop. If macroblock-level rate control is allowed, then control passes to a function block 245, which estimates a QP for each macroblock according to the RD (rate-distortion) model and frame QP, and passes control to a function block 250.

Function block 250 encodes a current macroblock, and passes control to a function block 255. Function block 255, which is performed after one macroblock is coded, updates the RD model along with other statistics, and passes control to end loop block 265.

End loop block 265 passes control to a function block 270, which updates the buffer fullness and other statistics (e.g., the target bits for next frame and the parameters in the RD model) when a frame coding is finished, and passes control to the end loop block 275, which passes control to an end block 280 after all the frames are coded.

A description will now be given of some of the many issues addressed by the present invention in providing adaptive rate control for encoding video data. The present invention builds upon the model used in TMN8 of H.263+. This model uses Lagrangian optimization to minimize distortion subject to the target bitrate constraint. To adapt the model into the International Telecommunication Union, Telecommunication Sector (ITU-T) H.264 standard and to further improve the performance, several issues have to be considered. First, rate-distortion optimization (RDO) (e.g., rate-constrained motion estimation and mode decision) is a widely accepted approach in H.264 for mode decision and motion estimation, where the quantization parameter (QP) (used to decide $\lambda$ in the Lagrangian optimization) needs to be decided before RDO is performed. But the TMN8 model requires the statistics of prediction error signal (residue) to estimate the QP, which means that motion estimation and mode decision needs to be performed before the QP is made, thus resulting in a dilemma of which dependent parameter must be calculated first, each value requiring knowledge about the other uncalculated value on which to base the determination.

Second, TMN8 is targeted at low delay applications, but H.264 can be used for various applications. Therefore a new bit allocation and buffer management scheme is needed for various content. Third, TMN8 adapts the QP at the macroblock level. Although a constraint is made on the QP difference (DQUANT) between the current macroblock and the last coded macroblock, subjective effects of large QP variations within the same picture can be observed and has a negative subjective effect. In addition, it is known that using a constant QP for the whole image may save additional bits for coding DQUANT, thus achieving higher PSNR for very low bit rate. Finally, H.264 uses 4×4 integer transform and if the codec uses some thresholding techniques such as in JM reference software, details may be lost. Therefore, it is useful to adopt the perceptual model in the rate control to maintain the details.

Preprocessing Stage

From equation (4), it can be see that the TMN8 model requires the knowledge of standard deviation of the residue to estimate QP. However, RDO requires knowledge of the QP to perform motion estimation and mode decision to thus produce the residue. To overcome this dilemma, the first conventional method mentioned above uses the residue of the collocated macroblock in the most recently coded picture with the same type to predict that of the current macroblock, and the second conventional method mentioned above employs a two-step encoding, where the QP of the previous picture ($QP_{prev}$) is first used to generate the residue, and then the QP of current macroblock is estimated based on the residue. The former approach (i.e., the first conventional method) is simple, but it lacks precision. The latter approach (i.e., the second conventional method) is more accurate, but it requires multiple encoding, thus adding too much complexity.

According to the present invention, a different approach is adopted to estimate the residue, which is simpler than the second convention method mentioned above, but more accurate than the first conventional method mentioned above. Experiments show that a simple preprocessing stage can give a good estimation of the residue. For an I picture, only the 3 most probable intra16×16 modes (vertical, horizontal and Discrete Cosine (DC) mode) are tested and the MSE (Mean Square Error) of the prediction residual is used to select the best mode. Only three modes are tested in order to reduce complexity. However, in other embodiments of the present invention, more or fewer modes can be tested while maintaining the spirit of the present invention. The spatial residue is then generated using the best mode. It should be noted that the original pixel values are used for intra prediction instead of reconstructed pixels, simply because the reconstructed pixels are not available.

For P pictures, a rate-constrained motion search is performed using only the 16×16 block type and 1 reference picture. The temporal residue is generated using the best motion vector in this mode. The average QP of the previously coded picture is used to decide $\lambda$ on a rate-constrained motion search. The experiment shows that by constraining the difference of the QP between the previous coded picture and the current picture, the $\lambda$ based on $QP_{prev}$ has a minor impact on motion estimation. The side advantage of this approach is that the resultant motion vectors in the preprocessing step can be used as initial motion vectors in the motion estimation during the encoding.

Frame-Layer Rate Control

TMN8 is targeted to low-delay and low bit rate applications, which is assumed to encode only P pictures after the first I picture, hence the bit allocation model as shown in equation (1) should be re-defined to adapt to the various applications which use more frequent I pictures. The QP estimation model by equation (4) can result in large QP variation within one image, thus a frame-level QP is better first estimated to place a constraint on the variation of the macroblock (MB) QP. In addition, for very low bit rate, due to the overhead of coding the DQUANT, it may be more efficient to use a constant picture QP. Thus, a good rate control scheme should allow rate control at both the frame-level and the MB-level.

A description will first be provided of a new bit allocation scheme in accordance with the principles of the present invention. Then, a description will be provided of a simple scheme to decide a frame-level QP in accordance with the principles of the present invention.

In many applications, e.g., in real-time encoders, the encoder does not know the total number of frames that need to be coded beforehand, or when scene changes will occur. Thus, a Group of Pictures (GOP) layer rate control is adopted to allocate target bits for each picture. The H.264 standard does not actually include Group of Pictures, but the terminology is used here to represent the distance between I pictures. The length of the GOP is indicated by $N_{GOP}$. If $N_{GOP} \to \infty$, then the following is set $N_{GOP}=F$, which corresponds to one second's length of frames. Notation $BG_{i,j}$ is used to indicate the remaining bits in the GOP i after coding picture j-1, equal to $$BG_{i,j} = \begin{cases} \min(RG_{i-1} + R/F*N_{GOP}, R/F*N_{GOP} + M*0.2), & j=0 \\ BG_{i,j-1} - B'_{i,j-1}, & \text{otherwise} \end{cases} \quad (5)$$

In the above equation, $RG_{i-1}$ is the number of remaining bits after GOP i-1 is coded, given by $RG_{i-1}=R/F*N_{coded}-B_{coded}$, where $B_{coded}$ is the used bits and $N_{coded}$ is the number of coded pictures after GOP i is finished. $B_{i,j}$ and $B'_{i,j}$ are the target bits and actual used bits for frame j of GOP i, respectively. In equation (5), one constraint is added on the total number of bits allocated for the GOP i to prevent buffer overflow when the complexity level of the content varies dramatically from one GOP to another. For example, consider a scenario where the previous GOP was of very low complexity, e.g., all black, so the buffer fullness level would go quite low. Instead of allocating all of the unused bits from the previous GOP to the current GOP, the unused bits are distributed over several following GOPs by not allowing more than 0.2M additional bits to an individual GOP. The target frame bit $B_{i,j}$ is then allocated according to picture type. If the jth picture is P, then the target bits is $B_{i,j}{}^P=BG_{i,j}/(K^I N^I+N^P)$, where $K^I$ is the bit ratio between I pictures and P pictures, which can be estimated using a sliding window approach, $N^I$ is the remaining number of I pictures in GOP i and $N^P$ is that of P pictures; otherwise, $B_{i,j}{}^I=K^I B_{i,j}{}^P$. Since P pictures are used as the references by subsequent P pictures in the same GOP, more target bits are allocated for P pictures that are at the beginning of the GOP to ensure the later P pictures can be predicted from the references of better quality and the coding quality can be improved. A linear weighted P picture target bit allocation is used as follows:

$$B_{i,j}{}^P += R/F*0.2*(N_{GOP}-2j)/(N_{GOP}-2) \quad (6).$$

Another constraint is added to better meet that target bits for a GOP as $$B_{i,j} += 0.1*B_{diff},$$

where $B_{diff,j-1}=B_{i,j-1}-B'_{i,j-1}$, and $B_{diff,j-1}=\text{sign}(B_{diff,j-1})\min(|B_{diff,j-1}|,R/F)$.

As an exemplary rate control according to the present invention, a 50% buffer occupancy is sought. To prevent buffer overflow or underflow, the target bits need to be jointly adapted with buffer level. The buffer level W is updated at the end of coding each picture by equation (3). According to the principles of the present invention, instead of using the real buffer level to adjust the target bits, a virtual buffer level W' given by W'=max(W,0.4M) is proposed. This helps prevent the scenario that if the previously coded pictures are of very low complexity such as black scenes and consume very few bits, then the buffer level will become very low. If the real buffer level is used to adjust target frame bits as in equation (7), too many bits may be allocated, which will cause the QP to decrease very quickly. After a while, when the scene returns to normal, the low QP will easily cause the buffer to overflow. Hence, it is needed to either increase QP dramatically or skip the frames. This causes the temporal quality to vary significantly. Then, the bits are adjusted by buffer control as follows:

$$B_{i,j}=B_{i,j}*(2M-W')/(M+W') \quad (7)$$

To guarantee a minimum level of quality, the following is set $B_{i,j}=\max(0.6*R/F,B_{i,j})$. To further avoid the buffer overflow and underflow, the buffer safety top margin $W_T$ and bottom margin $W_B$ for an I picture are set as $W_T{}^I=0.75M$, and $W_N{}^I=0.25M$. As for P pictures, compliant with equation (5) and to allow enough buffer for the next I picture in the next GOP, the following is set $W_T{}^P=(1-((0.4-0.2)/(N-1)*j+0.2))*M$, and $W_B{}^P=0.1M$. The final target bits are determined as follows. The following is set $W_{VT}=W+B_{i,j}$, $W_{VB}=W_{VT}-R/F$. If $W_{VT}<W_T$, B-=$W_{VT}-W_T$, else if $W_{VB}<W_B$, B+=$W_B-W_{VB}$.

It is to be noted that if a scene change detector is employed, the picture at the scene change is encoded to be an I picture and a new GOP starts from this I picture. The above scheme can still be employed.

A new approach in accordance with the principles of the present invention is proposed to decide frame-level QP based on the macroblock-level QPs found in equation (4). Equation (4) is modified as follows:

$$\hat{Q}_i = \sqrt{\frac{AK}{B-\hat{C}} \frac{\sigma_i}{\alpha_i} \sum_{k=1}^{N} \alpha_k \sigma_k}, \quad (8)$$

where $\hat{c}$ is the overhead from the last coded picture with the same type, $\sigma_i$ is estimated in the preprocessing stage as described above. Two approaches in accordance with the principles of the present invention can be used to get frame-level constant QP, denoted as $QP_f$. The first approach is to set $\alpha_i=\sigma_i$, so that all the MB QPs are equal. The second approach is to use the same $\alpha_i$ as that of the MB level, as defined hereinafter, then use the mean, median or mode of the histogram of the $\hat{Q}_i$ values to find the $QP_f$.

In a preferred embodiment of the present invention, the second approach to get $QP_f$ is used to better match the MB QP. The frame-level quantization step size is decided by the mean of the $\hat{Q}_i$ values, $$\hat{Q}_f = \sum_{i=1}^{N} \hat{Q}_i/N.$$

It is noted that there is a conversion between the quantization parameter QP and quantization step size Q by $Q=-2^{(QP-6)/6}$. To reduce the temporal quality variation between adjacent pictures, the following is set $QP_f=\max(QP_f{}^1-D_f, \min(QP_f{}^1+QP_f))$, where $QP_f{}^1$ is the frame QP of last coded frame, and $$D_f = \begin{cases} 2 & W < 0.7M \\ 4 & \text{otherwise.} \end{cases}$$

Since scene changes usually cause higher buffer levels, advantage is taken of temporal masking effect and $D_f$ is set to be a higher value when a scene change occurs.

MB-Layer Rate Control

A first key feature in MB-layer rate control pertains to the adaptive selection of weighted distortion $\alpha_i$ to get a better perceptual quality. A second key feature is to reduce the variation of the MB QPs in the same picture.

For low detail content, such as an ocean wave, a lower QP is required to keep the details. However, from an RDO point of view, a higher QP is preferred because the lower detail content tends to give a higher PSNR. To keep a balance, different settings of $\alpha_i$ are adopted for I and P pictures, respectively. For an I picture, a higher distortion weight is given to the MBs with less detail, so that the detail can be better retained. Accordingly, the following is set:

$$\alpha_i = (\sigma_i + 2\sigma_{avg})/(2\sigma_i + \sigma_{avg}),$$

$$\text{where } \sigma_{avg} = \sum_{i=1}^{N} \sigma_i / N.$$

For a P picture, a higher distortion weight is given to the MBs with more residue errors. Accordingly, $$\alpha_i = \begin{cases} 2B/AN(1-\sigma_i) + \sigma_i, & B/AN < 0.5 \\ 1, & \text{otherwise} \end{cases}$$

In this way, better perceptual quality is maintained for an I picture and can be propagated to the following P pictures, while higher objective quality is still maintained. To prevent large variation of the quality inside one picture, the following is set $QP_i = \max(QP_f - 2, \min(QP_i, QP_f + 2))$. If a frame level rate control is used, then $QP_i = QP_f$.

Virtual Frame Skipping

After encoding one picture, W is updated by equation (3). If W>0.9M, the next frame is virtually skipped until the buffer level is below 0.9M. Virtual frame skipping is to code every MB in the P picture to be SKIP mode. In this way, a constant frame rate can be syntactically maintained. If the current frame is determined to be a virtual skipped frame, then the following is set $QP_f = QP'_f + 2$.

In summary, the rate control scheme according to the present invention includes the following steps: preprocessing, frame target bits allocation and frame-level constant QP estimation, MB-level QP estimation, buffer updates and virtual frame skipping control. Advantageously, the present invention can allow both frame-level and MB-level rate control.

A description will now be given of some of the many attendant advantages/features of the present invention, according to various illustrative embodiments of the present invention. For example, one advantage/feature is the use of mean/median/mode of initial macroblock QP estimates to select frame level QP. Another advantage/feature is when the selected frame level QP is used in the calculation of the individual macroblock QPs. Yet another advantage/feature is when performing intra prediction, using a subset of the allowable intra-prediction modes to form the residue that is used in the QP selection process. Moreover, another advantage/feature is the use of a small number of intra-prediction modes (three (3), for example). Also, another advantage/feature is when a previous GOP was coded with a large number of unused bits, limiting the additional bits allocated to the current GOP to a predetermined threshold. Still another advantage/feature is when a virtual buffer level instead of an actual buffer level is used for buffer control.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

What is claimed is:

1. A video encoder for encoding image frames that are divisible into macroblocks,
   the video encoder configured to generate a quantization parameter (QP) estimate for the macroblocks of an image frame, to select of a frame level QP for the image frame using mode of QP estimates for the macroblocks, and to encode the image frame using the frame level QP,
   wherein the QP estimates for the macroblocks and the frame level QP for the image frame respectively correspond to variables used to scale transform coefficient levels.

2. The video encoder as defined in claim 1, wherein the image frames comprise video data in compliance with the International Telecommunication Union, Telecommunication Sector (ITU-T) H.264 standard.

3. The video encoder as defined in claim 1, further comprising a macroblock QP calculator in signal communication with said frame level QP selection to calculate individual macroblock QPs using the selected frame level QP.

4. The video encoder as defined in claim 3, wherein said macroblock QP calculator adjusts the individual macroblock QPs based on picture type.

5. The video encoder as defined in claim 4, wherein said macroblock QP calculator adjusts the individual macroblock QPs to maintain more details for Intra-coded pictures than for Inter-coded pictures, and to achieve lower mean square errors for the Inter-coded pictures than for the Intra-coded pictures.

6. The video encoder as defined in claim 1,
wherein the video encoder is further configured to determine intra prediction to intra predict the macroblocks using a subset of allowable intra prediction modes to form predictions for the macroblocks and to determine prediction residual calculations that are in signal communication with said intra prediction determinations and with said macroblock QP estimation for calculating prediction residuals for the predictions, and wherein said macroblock QP estimation uses at least one of the residuals calculated by said prediction residual calculating means for generating the QP estimate.

7. The video encoder as defined in claim 6, wherein the video encoder is further configured to select a mode selection in signal communication with said prediction residual calculations to select one of the modes in the subset using a mean square error of the prediction residuals.

8. The video encoder as defined in claim 7, wherein the selected one of the modes in the subset provides a most accurate prediction for a current frame than other ones of the modes in the subset.

9. The video encoder as defined in claim 6, wherein the subset includes three intra prediction modes.

10. The video encoder as defined in claim 9, wherein the three intra prediction modes are a vertical intra prediction mode, a horizontal intra prediction mode, and a (DC) intra prediction mode.

11. The video encoder as defined in claim 1, wherein each of the image frames represents a single picture, and the video encoder further comprises bit allocation means in signal communication with said frame level QP selection allocates more target bits for pictures at a beginning of a Group of Pictures (GOP) than subsequent pictures in the GOP.

12. The video encoder as defined in claim 1, wherein each of the image frames represents a single picture, and the video encoder further comprises bit allocation means in signal communication with said frame level QP selection limits a total number of bits allocated to a current Group of Pictures (GOP) when a previous GOP was coded with a number of bits one of below a pre-defined minimum threshold and above a pre-defined maximum threshold.

13. The video encoder as defined in claim 12, wherein said bit allocation means limits the total number of bits using a linear weighted allocation scheme.

14. The video encoder as defined in claim 12, wherein said bit allocation means limits the total number of bits based on a virtual buffer level, the virtual buffer level for simulating a fullness of an actual used buffer and being constrained in capacity with respect to the actual used buffer.

15. The video encoder as defined in claim 12, wherein said bit allocation means limits the total number of bits with respect to a minimum quality and at least one of a buffer safety top margin relating to buffer overflow and a buffer safety bottom margin relating to buffer underflow.

16. The video encoder as defined in claim 1, further comprising virtual frame skipping means in signal communication with said frame level QP selection to virtually skip a next frame to be encoded when a current buffer level is above a predefined maximum threshold.

17. A method for encoding image frames that are divisible into macroblocks, comprising the steps of:
generating a quantization parameter (QP) estimate for the macroblocks of an image frame;
selecting a frame level QP for the image frame, using mode of QP estimates for the macroblocks; and
encoding the image frame using the frame level QP,
wherein the QP estimates for the macroblocks and the frame level QP for the image frame respectively correspond to variables used to scale transform coefficient levels.

18. The method as defined in claim 17, wherein the image frames comprise video data in compliance with the International Telecommunication Union, Telecommunication Sector (ITU-T) H.264 standard.

19. The method as defined in claim 17, further comprising the step of calculating individual macroblock QPs using the selected frame level QP.

20. The method as defined in claim 19, further comprising the step of adjusting the individual macroblock QPs based on picture type.

21. The method as defined in claim 20, wherein the individual macroblock QPs are adjusted to maintain more details for Intra-coded pictures than for Inter-coded pictures, and to achieve lower mean square errors for the Inter-coded pictures than for the Intra-coded pictures.

22. The method as defined in claim 17, further comprising the steps of:
intra predicting the macroblocks using a subset of allowable intra prediction modes to form predictions for the macroblocks; and
calculating prediction residuals for the predictions,
wherein said generating step uses at least one of the residuals calculated at said calculating step for generating the QP estimate.

23. The method as defined in claim 22, further comprising the step of selecting one of the modes in the subset using a mean square error of the prediction residuals.

24. The method as defined in claim 23, wherein the selected one of the modes in the subset provides a most accurate prediction for a current frame than other ones of the modes in the subset.

25. The method as defined in claim 22, wherein the subset includes three intra prediction modes.

26. The method as defined in claim 25, wherein the three intra prediction modes are a vertical intra prediction mode, a horizontal intra prediction mode, and a DC intra prediction mode.

27. The method as defined in claim 17, wherein each of the image frames represents a single picture, and the method further comprises the step of allocating more target bits for pictures at a beginning of a Group of Pictures (GOP) than subsequent pictures in the GOP.

28. The method as defined in claim 17, wherein each of the image frames represents a single picture, and the method further comprises the step of limiting a total number of bits allocated to a current Group of Pictures (GOP) when a previous GOP was coded with a number of bits one of below a pre-defined minimum threshold and above a predefined maximum threshold.

29. The method as defined in claim 28, wherein said limiting step limits the total number of bits using a linear weighted allocation scheme.

30. The method as defined in claim 28, wherein said limiting step limits the total number of bits based on a virtual buffer level, the virtual buffer level for simulating a fullness of an actual used buffer and being constrained in capacity with respect to an actual used buffer.

31. The method as defined in claim 28, wherein said limiting step limits the total number of bits with respect to a minimum quality and at least one of a buffer safety top margin relating to buffer overflow and a buffer safety bottom margin relating to buffer underflow.

32. The method as defined in claim 17, further comprising the step of virtually skipping a next frame to be encoded when a current buffer level is above a predefined maximum threshold.

33. A video encoder configured to encode video image frames that are divisible into macroblocks comprising
a quantizer configured to determine a quantization parameter (QP) estimate for at least a macroblock of an image frame and configured to select a frame level QP for the image frame, using at least one of a mean, a media and a mode of QP estimates for the macroblock,
wherein the QP estimates for the macroblock and the frame level QP for the image frame correspond to variables used to scale transform coefficient levels, and
wherein the video encoder is configured to encode the image frame using the frame level QP.

34. The method as defined in claim 17, wherein said step of selecting the frame level QP for the image frame uses one of mean, median, and the mode of the QP estimates for the macroblocks.

35. The video encoder as defined in claim 1, wherein said selection of the frame level QP for the image frame uses the mode of a histogram of quantization step sizes for the macroblocks, the quantization step sizes being determined based on the QP estimates for the macroblocks.

36. The method as defined in claim 17, wherein said step of selecting the frame level QP for the image frame uses the mode of a histogram of quantization step sizes for the macroblocks, the quantization step sizes being determined based on the QP estimates for the macroblocks.

37. The video encoder as defined in claim 33, wherein said quantizer performs the selection of the frame level QP for the image frame using the mode of a histogram of quantization step sizes for the macroblocks, the quantization step sizes being determined based on the QP estimates for the macroblocks.

38. A video encoder for encoding image frames that are divisible into macroblocks,
the video encoder configured to pre-process an image frame based on a type of the image frame and configured to generate a quantization parameter (QP) estimate for the macroblocks of the image frame based on statistics generated by pre-processing of the image frame; and
the video encoder configured to select a frame level QP for the image frame, using mode of QP estimates for the macroblocks and to encode the image frame using the frame level QP,
wherein the pre-processing of the frame includes intra coding a subset of allowable intra prediction modes and obtaining an estimation of a prediction residual based on the intra coding of the subset, and
wherein the QP estimates for the macroblocks and the frame level QP for the image frame respectively correspond to variables used to scale transform coefficient levels.

39. The video encoder as defined in claim 38, wherein the image frames comprise video data in compliance with the International Telecommunication Union, Telecommunication Sector (ITU-T) H.264 standard.

40. The video encoder as defined in claim 38, further comprising a macroblock QP calculator in signal communication with said frame level QP selection to calculate individual macroblock QPs using the selected frame level QP.

41. The video encoder as defined in claim 1, wherein each of the image frames represents a single picture, and the video encoder further comprises bit allocation means in signal communication with said frame level QP selection allocates more target bits for pictures at a beginning of a Group of Pictures (GOP) than subsequent pictures in the GOP.

* * * * *